United States Patent
Di Pietro et al.

(10) Patent No.: US 9,389,610 B2
(45) Date of Patent: Jul. 12, 2016

(54) WIRELESS TRANSMISSION MODULE, DIAGNOSTIC SYSTEM OF AN INDUSTRIAL MACHINE AND METHOD OF SUPPLYING THE TRANSMISSION MODULE

(71) Applicant: I-CARE, Mons (BE)

(72) Inventors: Thomas Di Pietro, Anderlues (BE); Fabrice Brion, Jemappes (BE); Arnaud Stievenart, Waterloo (BE)

(73) Assignee: I-CARE SPRL, Mons (BE)

( * ) Notice: Subject to any disclaimer, the term of this patent is extended or adjusted under 35 U.S.C. 154(b) by 0 days.

(21) Appl. No.: 14/800,978

(22) Filed: Jul. 16, 2015

(65) Prior Publication Data

US 2016/0018820 A1    Jan. 21, 2016

(30) Foreign Application Priority Data

Jul. 16, 2014    (BE) .................................. 201400560

(51) Int. Cl.
| | |
|---|---|
| *G05B 23/02* | (2006.01) |
| *G01M 7/02* | (2006.01) |
| *G06F 1/32* | (2006.01) |
| *H04Q 9/00* | (2006.01) |
| *H04W 52/02* | (2009.01) |

(52) U.S. Cl.
CPC ........... *G05B 23/0208* (2013.01); *G01M 7/025* (2013.01); *G06F 1/3203* (2013.01); *H04Q 9/00* (2013.01); *H04W 52/0216* (2013.01); *H04Q 2209/88* (2013.01); *H04Q 2209/883* (2013.01)

(58) Field of Classification Search
CPC .. G05B 23/0208; G05B 23/00; G05B 23/021; G05B 23/02; G05B 21/00; G01M 7/025; G01M 7/00; G05F 1/52; G05F 1/42; G05F 1/445

See application file for complete search history.

(56) References Cited

U.S. PATENT DOCUMENTS

| | | | |
|---|---|---|---|
| 5,726,911 | A | 3/1998 | Canada et al. |
| 5,845,230 | A | 12/1998 | Lamberson |
| 5,852,351 | A | 12/1998 | Canada et al. |
| 5,854,994 | A | 12/1998 | Canada et al. |
| 5,907,491 | A | 5/1999 | Canada et al. |
| 5,992,237 | A | 11/1999 | McCarty et al. |
| 6,006,164 | A | 12/1999 | McCarty et al. |
| 6,078,874 | A | 6/2000 | Piety et al. |
| 6,124,692 | A | 9/2000 | Canada et al. |
| 6,138,078 | A | 10/2000 | Canada et al. |
| 6,202,491 | B1 | 3/2001 | McCarty et al. |
| 6,220,098 | B1 | 4/2001 | Johnson et al. |

(Continued)

OTHER PUBLICATIONS

SFK Group, SKF Wireless Machine Condition Sensor, May 2014, United States.

(Continued)

*Primary Examiner* — Manuel L Barbee
(74) *Attorney, Agent, or Firm* — Robinson IP Law, PLLC

(57) ABSTRACT

A wireless signal transmission module for a diagnostic system of an industrial machine is provided including a case, an independent power source, a sensor arranged to take measurements, in particular vibration measurements, a connector having a first end connected to the case and a second end connected to the sensor, a fixing system connected to the sensor and arranged so as to fix the wireless signal transmission module to the industrial machine, an electronic card provided with means of control arranged so as to control the supply cycle of the sensor in a sleep phase, a first stabilisation phase and an operating phase.

13 Claims, 10 Drawing Sheets

(56) References Cited

U.S. PATENT DOCUMENTS

| | | |
|---|---|---|
| 6,257,066 B1 | 7/2001 | Chandler et al. |
| 6,297,742 B1 | 10/2001 | Canada et al. |
| 6,298,308 B1 | 10/2001 | Reid et al. |
| 6,301,514 B1 | 10/2001 | Canada et al. |
| 6,489,884 B1 | 12/2002 | Lamberson et al. |
| 6,513,386 B2 | 2/2003 | Barclay et al. |
| 6,598,479 B1 | 7/2003 | Robinson et al. |
| 6,633,822 B2 | 10/2003 | Maness et al. |
| 6,892,581 B2 | 5/2005 | Robinson et al. |
| 7,142,990 B2 | 11/2006 | Bouse et al. |
| 7,424,403 B2 | 9/2008 | Robinson et al. |
| 7,937,373 B2 | 5/2011 | Bouse et al. |
| 8,174,402 B2 | 5/2012 | Bouse et al. |
| 8,294,458 B2 | 10/2012 | Huggett et al. |
| 8,800,374 B2 | 8/2014 | Sonyey et al. |
| 8,973,815 B2 | 3/2015 | Murphy |
| 2003/0114127 A1* | 6/2003 | Baldwin ............. H04W 52/267 455/245.1 |
| 2004/0239525 A1 | 12/2004 | Kobayashi |
| 2010/0112959 A1 | 5/2010 | Nakagawa et al. |
| 2014/0067289 A1 | 3/2014 | Baldwin |
| 2014/0117059 A1 | 5/2014 | Piety et al. |
| 2014/0121996 A1 | 5/2014 | Piety et al. |
| 2014/0122085 A1 | 5/2014 | Piety et al. |
| 2014/0222378 A1 | 8/2014 | Piety et al. |
| 2014/0324367 A1 | 10/2014 | Garvey et al. |
| 2014/0324389 A1 | 10/2014 | Baldwin et al. |

OTHER PUBLICATIONS

Emerson Process Management, CSI 9420 Wireless Vibration Transmitter Product Data Sheet, 2009, United States.

Computational Systems, Inc., RBMconsultant RF Microanalyzer System, Installation and Reference Manual, 2000, United States.

Belgian International Search Report dated Sep. 16, 2014.

* cited by examiner

WIRELESS TRANSMISSION MODULE, DIAGNOSTIC SYSTEM OF AN INDUSTRIAL MACHINE AND METHOD OF SUPPLYING THE TRANSMISSION MODULE

CROSS-REFERENCE TO RELATED APPLICATION

This application claims priority to Belgian Patent Application Number 2014/00560 entitled "Sur Module De Transmission De Signaux Sans Fil, Systeme De Diagnostic De Machine Industrielle Et Procede D'Alimentation Du Module De Transmission" which was filed on Jul. 16, 2014, the entirety of which is incorporated herein by reference.

FIELD

This invention relates to a wireless signal transmission module for a diagnostic system of an industrial machine enabling remote precision monitoring of industrial equipment in extreme conditions. This invention also relates to a diagnostic system of an industrial machine and a method of supplying the transmission module.

BACKGROUND

The electrical supply of a sensor is generally achieved by means of a voltage or current with constant and predetermined characteristics. This configuration enables a constant mean power to be applied to the sensor terminals. Sensor manufacturers recommend a supply at a constant voltage or current for the sensors' entire duration of supply.

The use of a current regulation diode provides a current or voltage with constant characteristics at the sensor's terminals and thus enables a constant mean power to be applied.

On observing the values returned by a measurement sensor when it is switched on, it will be noted that these values take a certain time to stabilise. As a general rule, the values returned by the sensor increase until reaching a maximum value then decrease to reach an asymptotic value, as shown in FIG. 1. During its stabilisation phase, the sensor consumes energy whereas the values that it returns are not useable. This involves a not inconsiderable consumption of energy during the stabilisation phase.

There are some industrial devices that enable measurements to be made and sent wirelessly such as the EAGLE solution developed by the Acoem Company.

However, these solutions do not specifically address the problem of energy consumption during the sensor stabilisation phase. The life of the independent power supply is therefore affected.

One generally adopted solution to this technical problem consists in optimising the components in order to obtain a less energy-consuming solution and in particular using more sophisticated and more costly sensors in order to save energy and thus preserve the life of the energy source.

SUMMARY

One of the aims of this invention is to provide a wireless signal transmission module for a machine diagnostic system for which the life of the independent power source is prolonged without using optimisation of the sensor's components. The aim is to provide a less energy-consuming solution that does not require sophisticated and costly sensors.

In a first aspect, the present invention provides a wireless signal transmission module for a diagnostic system of an industrial machine comprising:
a. a case, comprising a cover and a body;
b. an independent power source, such as a battery or limited energy reserve, arranged to supply the module;
c. a sensor arranged to take measurements, in particular vibration measurements;
d. a connector, having a first end connected to the case and a second end connected to the sensor;
e. a fixing system connected to the sensor and arranged so as to fix the wireless signal transmission module to the industrial machine;
f. an electronic card, housed inside the body, the electronic card being provided with means of control arranged so as to control the supply cycle of the sensor in a sleep phase, a stabilisation phase and an operating phase, wherein:
   i. during the sleep phase, the sensor is not supplied with energy;
   ii. during the first stabilisation phase, the sensor is supplied discontinuously with energy in such a way that the mean power applied is less than 90% of the average power applied in the operating phase, and
   iii. during the operating phase, the sensor is supplied at its rated voltage and takes measurements.

It has been observed that, by combining these technical characteristics, a module can be obtained that is capable of saving the energy consumed by the sensor, thus prolonging the life of the independent power source.

In a second aspect of the present invention, the control means of the wireless signal transmission module are also arranged to modulate the sensor's supply during the stabilisation phase, for a duration of less than 20 seconds, at a switching frequency of between 10 Hz and 5000 kHz and a pre-determined duty cycle of between 3 and 20%, and more particularly between 5% and 9%. In one embodiment, the switching frequency is between 10 Hz and 500 kHz.

It has been observed that, by combining these technical characteristics, a maximum energy saving can be obtained for the module with no detrimental effect on the stabilisation of the sensor and the taking of measurements.

In a third aspect, the present invention provides a wireless signal transmission module for which the control means are also arranged to control the supply cycle with a second stabilisation phase situated between the first stabilisation phase and the operating phase, during which the mean power applied can be either equal to the operating power or less than the operating power.

It has been observed that, by combining these technical characteristics, a solution can be obtained enabling adaptation to a large variety of sensors and achieving the best results in terms of energy savings.

In a fourth aspect, the present invention provides a wireless transmission module according to one of the preceding claims, wherein the control means comprise an assembly comprising a DC/DC voltage converter and a controlled switch placed in series with the converter.

It has been observed that, by combining these technical characteristics, a device can be obtained that allows the sensor's supply to be precisely modulated while offering the possibility of adapting the modulation according to the sensor used.

In a fifth aspect, the present invention provides a wireless transmission module wherein the control means are arranged so as to adapt the switching frequency, duty cycle and cycle duration according to the sensor.

It has been observed that, by combining these technical characteristics, a solution can be obtained that enables the supplied power to be adapted to a wide variety of sensors.

In a sixth aspect, the present invention provides a wireless transmission module wherein the control means are arranged to supply the sensor during the stabilisation phase so that the mean power applied is between 3% and 20% of the mean power applied in the operating phase, and in particular between 5% and 9%.

It has been observed that by combining these technical characteristics, it is possible to obtain a solution enabling optimum results to be achieved in terms of energy savings without detriment to the performance of the sensor during the stabilisation phase.

In a seventh aspect, the present invention provides a diagnostic system of industrial machines, comprising a series of wireless transmission modules that may or may not be completed by wireless network extensions and a central signal receiver module arranged to receive the signals of the said modules.

In an eighth aspect, the present invention provides a method of supplying a wireless signal transmission module for a diagnostic system of an industrial machine comprising the application of a sleep phase, one or two stabilisation phases and an operating phase.

BRIEF DESCRIPTION OF THE DRAWINGS

The characteristics of the invention are described in particular in the claims. However, the invention itself is better understood by referring to the following detailed description of an example of an embodiment, together with the accompanying drawings, a description wherein:

FIG. 1 is a graph representing the values returned by a measurement sensor when it is switched on;

DETAILED DESCRIPTION

The present invention will be described in relation to the particular embodiments and with reference to certain drawings; however, the invention is not limited by these but solely by the claims. The drawings described are merely schematic and not limiting.

The various embodiments, although referred to as being "preferred" must be interpreted as examples whereby the invention can be implemented rather than as limiting the scope of the invention.

The word "comprising", used in the claims, must not be interpreted as being limited to the means or stages listed below; it does not exclude other elements or stages. It must be interpreted as specifying the presence of the elements, whole numbers, stages or components mentioned to which reference is made but does not exclude the presence or the addition of one or more other elements, whole numbers, stages or components or groups thereof. Thus, the scope of the expression "a device comprising A and B" shall not be limited to devices comprising solely components A and B, by contrast, with regard to the present invention, the only components of the device referred to are A and B, and the claim should also be interpreted as including the equivalents of these components.

The references to the figures drawn to describe the present invention in detail now follow. More details regarding the embodiments of the present invention are given on the basis of descriptions referring to the drawn figures.

Figure 2:
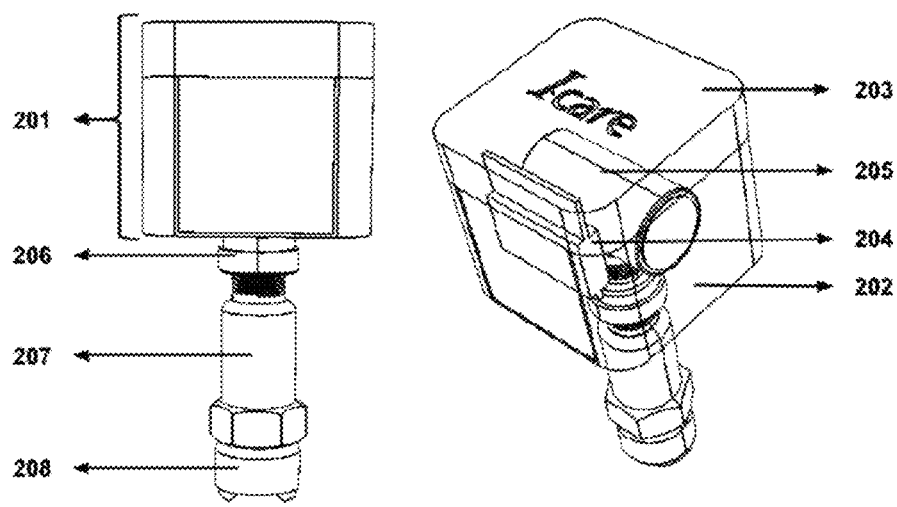
FIG. 2 is a front view and perspective view showing the different components of a wireless transmission module according to the invention.

FIG. 2 is a general cutaway view of the wireless transmission module comprising a case (201), composed of a body (202) and a cover (203), containing an electronic card (204) and an independent power source (205). FIG. 2 also shows the connector (206), which allows the connection between the casing and the sensor to be made, the sensor (207) and the fixing system (208) of the wireless transmission module.

Figure 3:
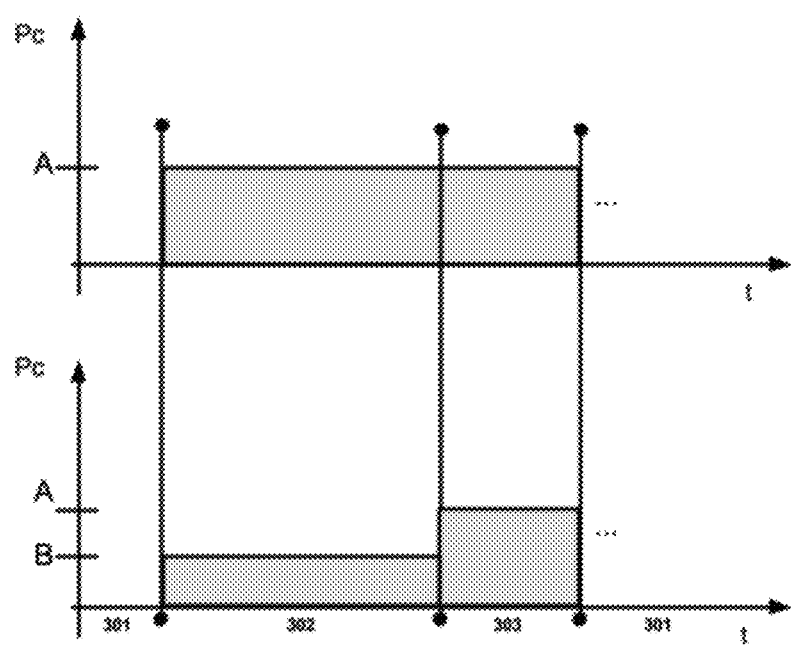
FIG. 3 is a graph representing the mean power applied in the case of a conventional method of supply compared to the mean power applied within the scope of the present invention.

FIG. 3 shows a comparison of the mean power applied ($P_c$) for a conventional supply scheme of a measurement sensor compared to the mean power applied for the supply scheme of the present invention. This figure shows the three phases of a sensor's supply cycle: supervision phase (301), stabilisation phase (302) and operating phase (303). This figure shows that for the present invention the mean power applied to the sensor during the stabilisation phase is less than the mean power applied during the operating phase.

Figure 4:
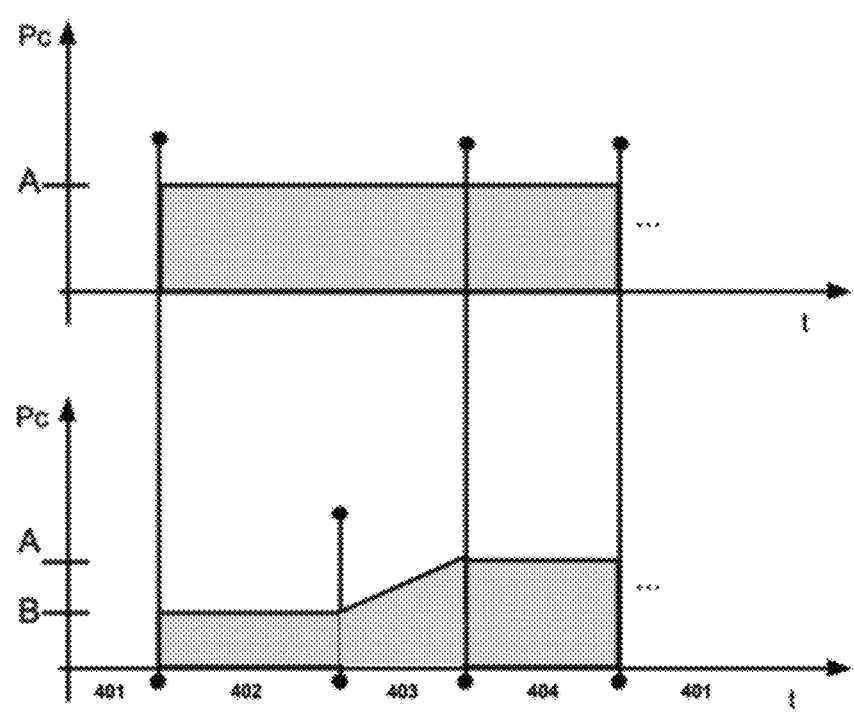
FIG. 4 is a graph representing another possibility of a method of supply of the present invention comprising a second stabilisation phase during which the mean power applied is less than the operating power.

FIG. 4 shows the case of the present invention where a second stabilisation phase exists during which the power applied increases until it reaches 100% of the operating power. In this case, the mean power applied ($P_c$) is greater than the mean power applied during the first stabilisation phase and less than that applied during the operating phase. This figure shows the four phases of the supply cycle of the case in point: sleep phase (401), first stabilisation phase (402), second stabilisation phase (403) and operating phase (404).

Figure 5:
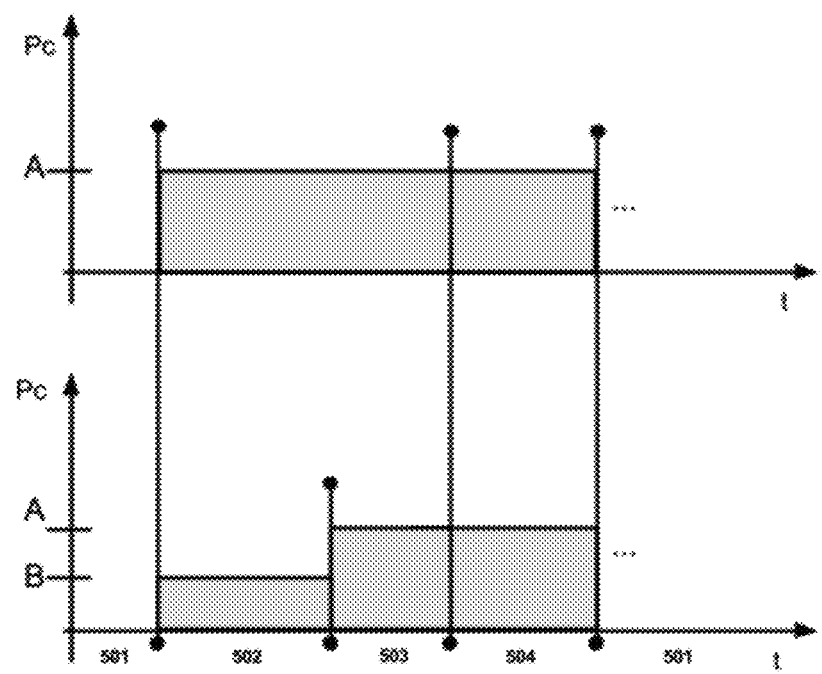
FIG. 5 is a graph representing another possible method of supply of the present invention comprising a second stabilisation phase during which the mean power applied is constant and equal to 100% of the operating power.

FIG. 5 shows the case of the present invention where a second stabilisation phase exists during which the mean power applied ($P_c$) is equal to 100% of the operating power. This figure shows the four phases of the supply cycle of the case in point: sleep phase (501), first stabilisation phase (502), second stabilisation phase (503) and operating phase (504).

Figure 6:
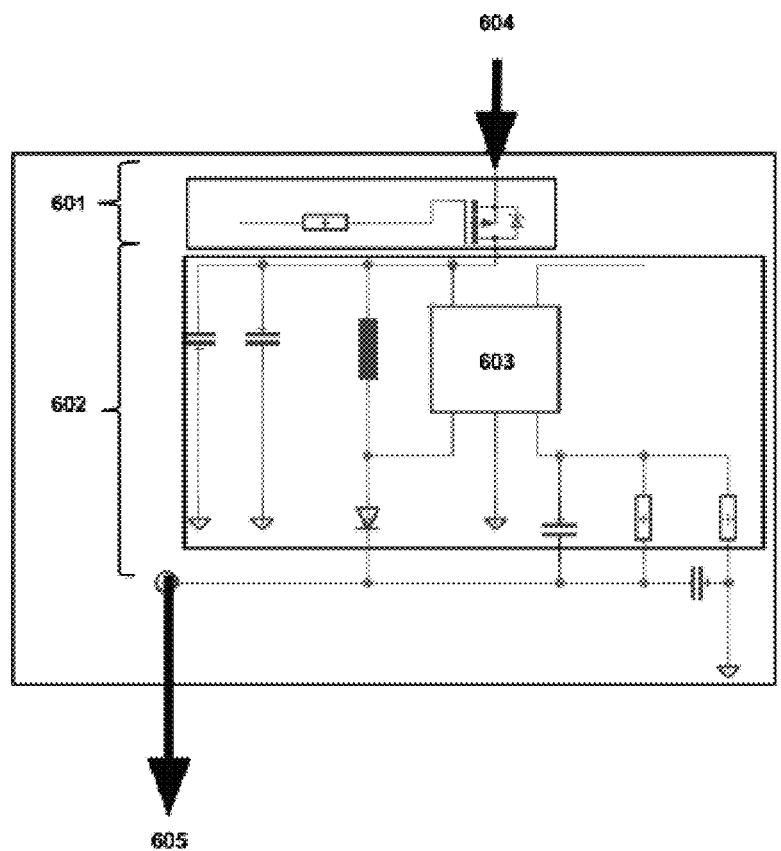
FIG. 6 shows the supply modulation system of the sensor of the present invention.

FIG. 6 shows the modulation system of the sensor's supply. The figure shows the controlled switch (601) placed in series with the DC/DC voltage converter (602) comprising a voltage converter (603). This figure also shows the connection terminals of the independent supply source (604) and the sensor's supply (605).

Figure 7:
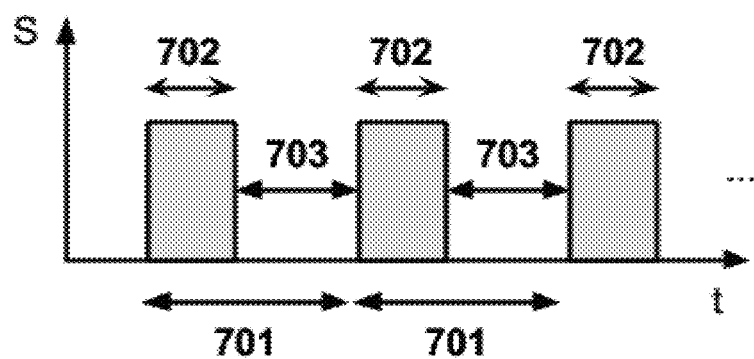
FIG. 7 shows the principle of modulation of a sensor's supply with periods during which the sensor is supplied and periods when the supply is zero.

FIG. 7 shows the principle of modulation of a sensor's supply. This figure represents the duration of a cycle (701) and periods during which the sensor is supplied (702) and those during which it is not supplied (703).

Figure 8:
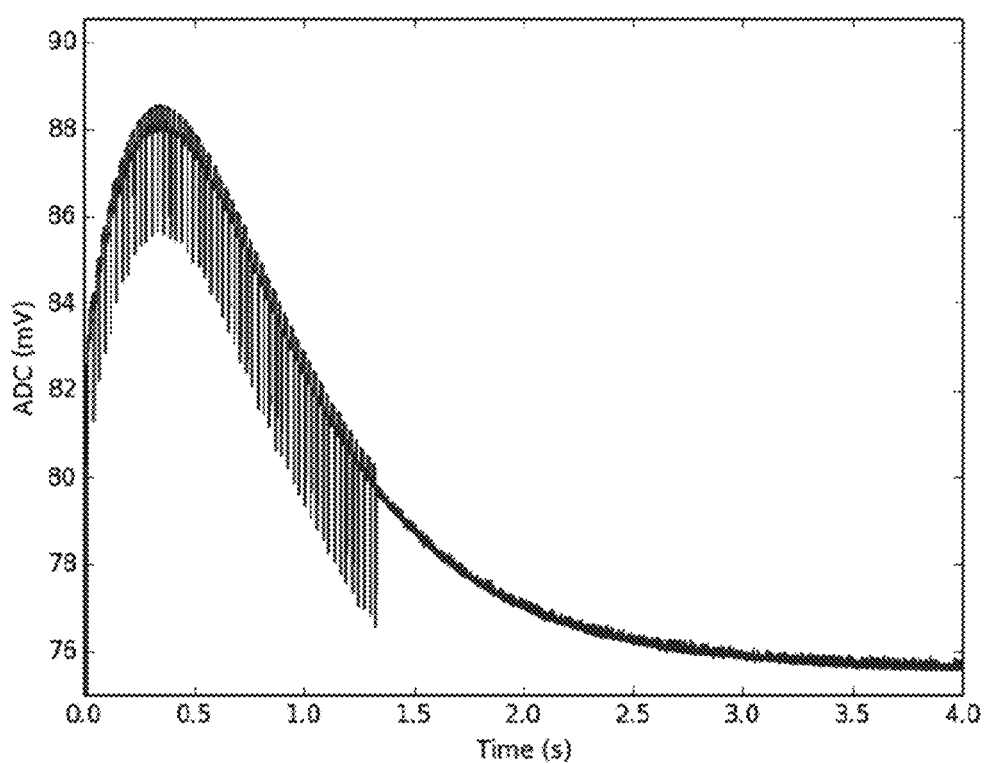
FIG. 8 shows the values returned by a sensor when its power is turned on by applying the principle of pulse-width modulation using a pre-defined duty cycle during the stabilisation phase.

FIG. 8 shows the values returned by a sensor when its supply is turned on by applying the principle of pulse-width modulation using a pre-defined duty cycle during the stabilisation phase.

Figure 9:
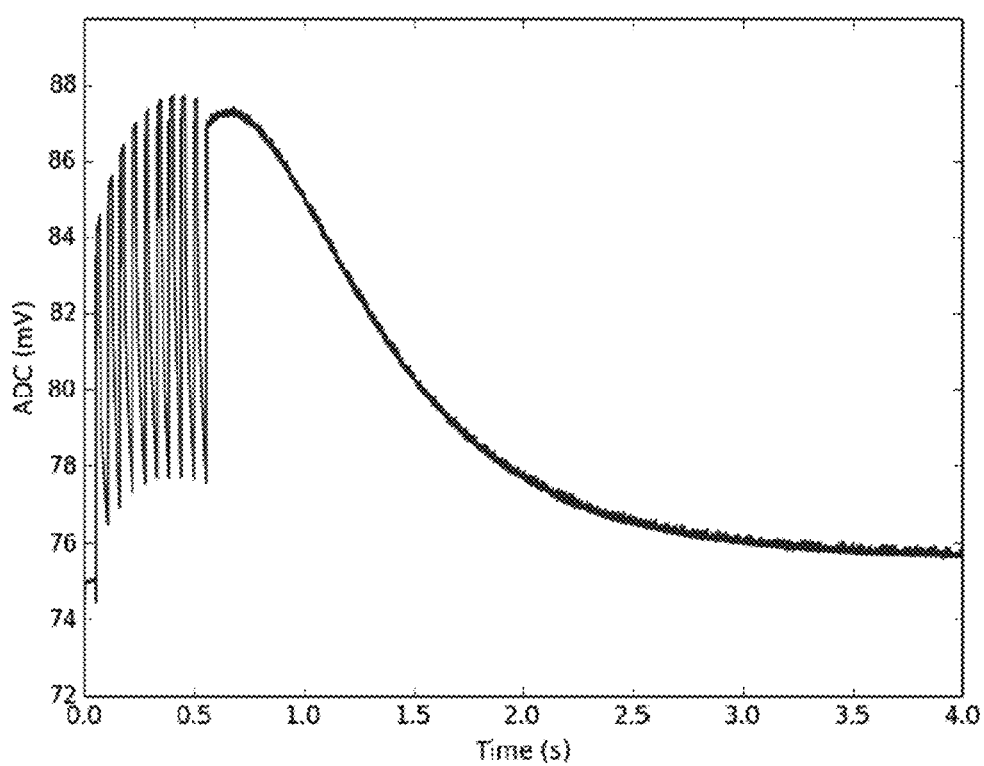
FIG. 9 shows the values returned by a sensor when its power is turned on by applying the principle of pulse-width modulation using a pre-defined cycle duration during the stabilisation phase.

FIG. 9 shows the values returned by a sensor when its supply is turned on by applying the principle of pulse-width modulation using a pre-defined cycle duration during the stabilisation phase.

Figure 10:
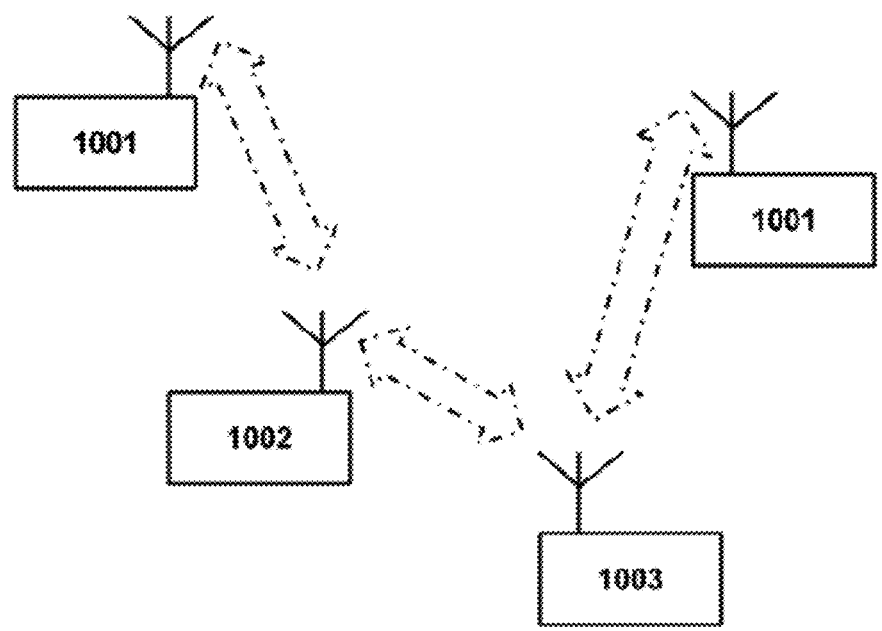
FIG. 10 shows the diagnostic system of industrial machines, comprising a series of wireless transmission modules, one or several wireless network extensions and one central signal receiver module arranged to receive the signals of the said modules.

FIG. 10 shows the diagnostic system of industrial machines, comprising a series of wireless transmission modules (1001), one or several wireless network extensions (1002) and one central signal receiver module arranged to receive the signals of the said modules (1003).

The present invention concerns a wireless signal transmission module for a diagnostic system of an industrial machine that allows industrial equipment to be remotely and accurately monitored under extreme conditions. The module is arranged to supply the sensor at pre-defined intervals so as to enable measurements to be taken. In between measurements, the module does not supply the measurement sensor; this is the sleep phase.

Figure 1:
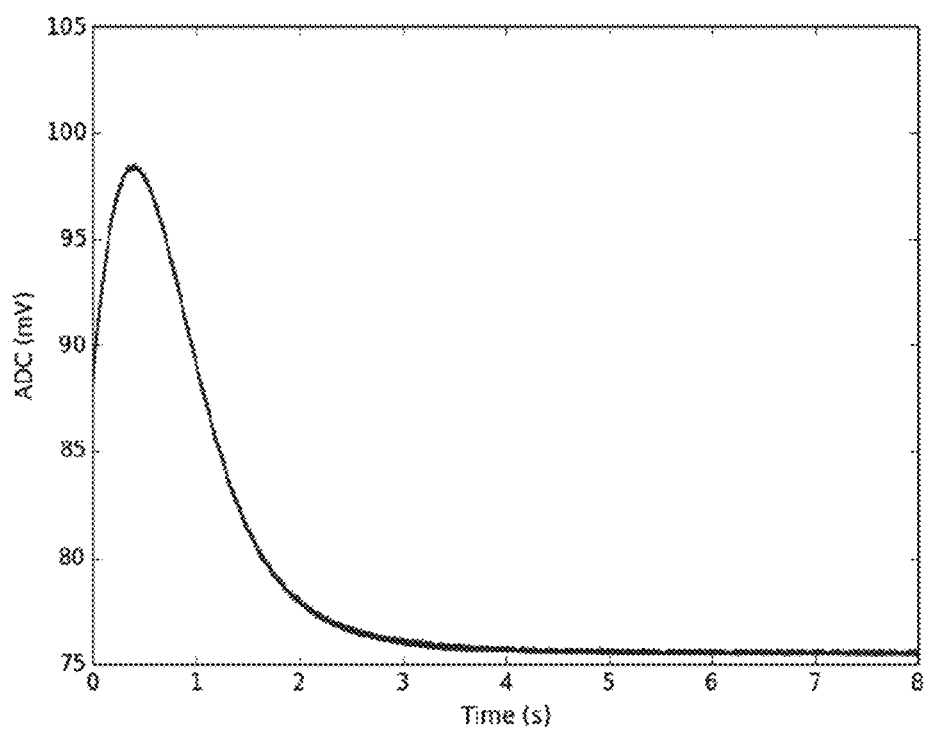

As described above in FIG. 2, the module consists of several elements. In particular, the electronic card comprises a device, shown in FIG. 6, which enables the sensor's supply to be controlled. This device consists of a controlled switch allowing the sensor supply to be switched on and off and thus enable measurements to begin when desired. In series with the controlled switch, a DC/DC converter allows a pulse-width modulation to be performed. The principle of pulse-width modulation is a widely used principle in direct current transformers in order to transform a voltage into a lower mean voltage. In the case of the present invention, the principle of pulse-width modulation is not used to obtain a lower mean voltage. The present invention adopts the principle of pulse-width modulation in order to achieve energy savings when switching on the measurement sensor. In fact, as shown in FIG. 1, when a measurement sensor is switched on, the values that it returns increase temporarily until reaching a maximum value then decrease towards an asymptotic value. There is a stabilisation phase during which the values returned by the sensor cannot be exploited when they are near the maximum value, which requires waiting several seconds before being able to take significant measurements. Once the stabilisation phase has passed, the sensor reaches its operating phase during which the values returned by the sensor tend towards an asymptotic value and can then be exploited.

The stabilisation phase is generally costly energy-wise as it involves supplying the sensor for several seconds without being able to exploit the measurements that it returns.

As shown in FIG. 3, the principle of pulse-width modulation used in the present invention is implemented in order to apply a lower mean power during the stabilisation phase and thus achieve energy savings.

In FIG. 7, the principle of pulse-width modulation implemented by the present invention during the stabilisation phase is shown. This principle lies in a succession of phases during which the sensor is supplied and phases during which the sensor is not supplied. The duration of a supply cycle is defined as the sum of the time when the supply is on and the time when the supply is off. Similarly, the duty cycle, expressed as a percentage, is defined as the relation between the period during which the sensor is supplied and the total duration of a supply cycle. The switching frequency corresponds to the number of times that the supply passes from the off state to the on state per unit of time.

In the embodiment of the invention described, the duty cycle, the duration of a supply cycle and the switching frequency are parameters that can be adapted from a software point of view depending on the sensor to be supplied in order to reach an acceptable compromise between energy saving and behaviour of the sensor during the stabilisation phase. The tests performed to implement the present invention have enabled preferred ranges of values for these parameters to be determined during the stabilisation phase within the scope of the present invention. FIGS. 8 and 9 show the values returned by a sensor on applying a pre-defined duty cycle and a pre-defined cycle duration respectively. It will be noted in both cases that the energy consumption of the sensor is less during the stabilisation phase compared to a conventional supply as shown in FIG. 1. However, the tests performed to implement the present invention have shown that the duty cycle should not be fixed at too low a value and that the duration of a cycle should not be too long so as not to disturb the sensor's stabilisation phase.

According to the preferred embodiments of the invention, the stabilisation phase must last less than 20 seconds, the switching frequency must be between 10 Hz and 100 kHz and the duty cycle must be between 5% and 9%. These parameters mean that the average power applied to the sensor in the stabilisation phase is between 5% and 9% of the mean power applied in the operating phase.

In certain embodiments of the invention, a second stabilisation phase may exist, as shown in FIGS. 4 and 5. In this case, the mean power applied can be equal to the mean operating power or less than the mean operating power.

Once the stabilisation phase is over, the sensor reaches its operating phase and the module supplies the sensor at its rated voltage in order to collect the measurements.

In the embodiment of the invention presented, the wireless signal transmission modules communicate with a central signal receiver module, in particular by using IEEE 802.15.4 technology. The invention can also comprise wireless network extensions allowing wireless signals to be relayed if the power of the signal does not allow effective communication with the central module.

In other embodiments of the invention, it is possible to use other principles to limit the mean power applied to a sensor during the stabilisation phase and thus reduce energy consumption. It is thus possible to reduce the current being supplied to it. At a constant supply voltage, the current is inversely proportional to the resistance of the load ($I=U/R$).

Figure 11:
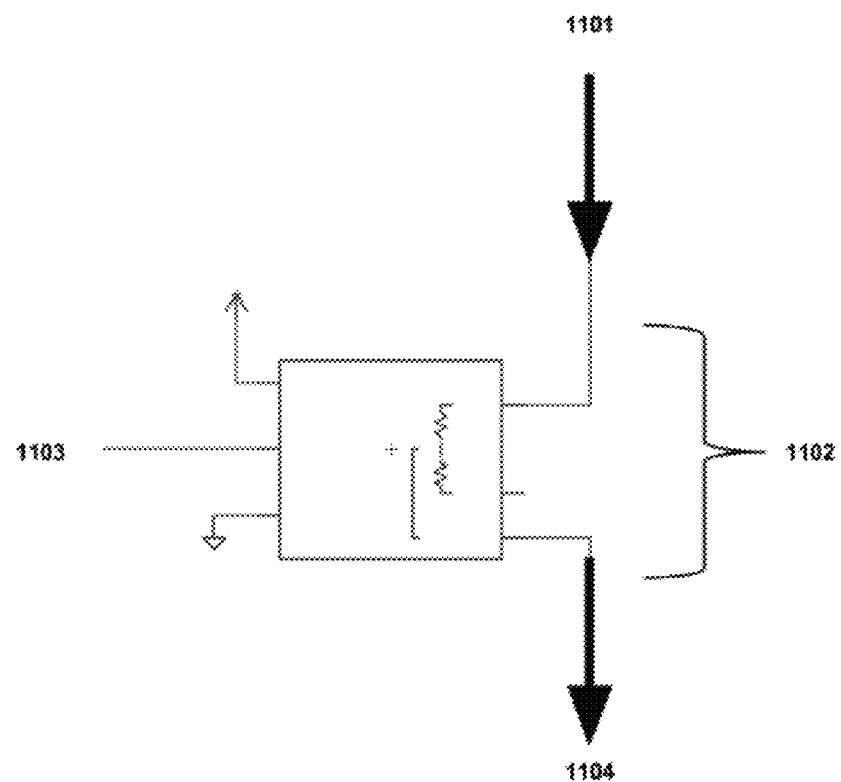
FIG. 11 shows another embodiment of the invention using a digital potentiometer allowing the power applied to the sensor to be varied.

By increasing a resistance in series with the sensor during the stabilisation phase, the power transmitted to the sensor is reduced. By decreasing the resistance in series to near zero during the operating phase, the power sent to the sensor is at its maximum. One way of performing this operation is to use a digital potentiometer such as the one shown in FIG. 11. This solution involves an independent supply source (1101) to which is connected a digital potentiometer (1102) that receives a digital control signal (1103). This solution allows the power transmitted to supply the sensor (1104) to be varied.

Nevertheless, these resistors dissipate part of the energy resulting from the supply so this solution has a lower energy efficiency than the solution initially proposed.

It is also possible to use a system based on current-regulator diodes placed in parallel and using controlled switches in order to vary the current applied to the sensor. In this way, the power applied to the sensor can be varied by gradually increasing the current.

A final possibility for limiting the power provided to the sensor is to vary the voltage at the sensor's terminals by using inductances placed in parallel and connected to controlled switches. By closing the switches, the equivalent inductance is increased and it is then possible to vary the voltage at the sensor's terminals.

What is claimed is:

1. A wireless signal transmission module for a diagnostic system of an industrial machine comprising:
   a. a case, comprising a cover and a body;
   b. an independent power source, such as a battery or limited energy reserve, arranged to supply the module;
   c. a sensor arranged to take measurements, in particular vibration measurements;
   d. a connector, having a first end connected to the case and a second end connected to the sensor;
   e. an electronic card, housed inside the body, the electronic card configured to control the supply cycle of the sensor in a sleep phase, a first stabilisation phase and an operating phase, wherein:
      i. during the sleep phase, the sensor is not supplied with energy;
      ii. during the first stabilisation phase, the sensor is supplied discontinuously with energy and during which the means of control supply the sensor in such a way that the mean power applied is less than 90% of the average power applied in the operating phase, and
      iii. during the operating phase, the sensor is supplied at its rated voltage and takes measurements.

2. The wireless signal transmission module according to claim 1, further comprising a fixing system connected to the sensor and arranged so as to fix the wireless signal transmission module to the industrial machine.

3. The wireless signal transmission module according to claim 1, wherein the electronic card is configured to modulate the sensor's supply during the stabilisation phase, for a duration of less than 20 seconds, at a switching frequency of between 10 Hz and 5000 kHz, and a pre-determined duty cycle of between 3 and 20.

4. The wireless signal transmission module according to claim 3, wherein the switching frequency is between 10 Hz and 500 kHz, and the pre-determined duty cycle is between 5% and 9%.

5. The wireless signal transmission module according to claim 3, wherein the electronic card is configured to control the supply cycle with a second stabilisation phase situated between the first stabilisation phase and the operating phase, during which the mean power applied is equal to 100% of the operating power.

6. The wireless signal transmission module according to claim 3, wherein the electronic card is configured to control the supply cycle with a second stabilisation phase situated between the first stabilisation phase and the operating phase, during which the mean power applied is greater than the mean power applied during the first stabilisation phase and less than the operating power.

7. The wireless transmission module according to claim 3, wherein the so as to adapt the switching frequency, duty cycle and cycle duration according to the sensor.

8. The wireless transmission module according to claim 1, wherein the electronic card includes an assembly comprising a DC/DC voltage converter and a controlled switch placed in series with the converter.

9. The wireless transmission module according to claim 1, wherein the control means are arranged to supply the sensor during the stabilisation phase so that the mean power applied is between 3% and 20% of the mean power applied in the operating phase.

10. The wireless transmission module according to claim 9, wherein the mean power applied is between 5% and 9%.

11. A diagnostic system of industrial machines comprising a series of wireless transmission modules according to claim 1 and a central signal receiver module arranged to receive the signals of the said modules.

12. The diagnostic system of industrial machines according to claim 11, further comprising at least one wireless network extension.

13. A method of supplying a wireless signal transmission module for a diagnostic system of an industrial machine comprising the application of a sleep phase, a stabilisation phase and an operating phase, wherein:
   i. during the sleep phase, a sensor of the wireless transmission module is not supplied with energy;
   ii. during the first stabilisation phase, the sensor is supplied discontinuously with energy and during which an electronic card of the wireless signal transmission module supplies the sensor in such a way that the mean power applied is less than 90% of the average power applied in the operating phase, and
   iii. during the operating phase, the sensor is supplied at its rated voltage and takes measurements.

* * * * *